(12) United States Patent
Okabe

(10) Patent No.: US 11,250,120 B2
(45) Date of Patent: Feb. 15, 2022

(54) AUTHENTICATION METHOD, AUTHENTICATION SYSTEM AND AUTHENTICATION APPARATUS

(71) Applicant: CASIO COMPUTER CO., LTD., Tokyo (JP)

(72) Inventor: Hiroyuki Okabe, Chofu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 379 days.

(21) Appl. No.: 16/358,079

(22) Filed: Mar. 19, 2019

(65) Prior Publication Data

US 2019/0294775 A1 Sep. 26, 2019

(30) Foreign Application Priority Data

Mar. 23, 2018 (JP) .............................. JP2018-056703

(51) Int. Cl.
  *G06F 21/36* (2013.01)
  *G06F 21/35* (2013.01)
  *G06K 7/14* (2006.01)

(52) U.S. Cl.
  CPC .............. *G06F 21/36* (2013.01); *G06F 21/35* (2013.01); *G06K 7/1417* (2013.01); *G06F 2221/2153* (2013.01)

(58) Field of Classification Search
  CPC .................................. G06F 21/36; G06F 21/35
  (Continued)

(56) References Cited

U.S. PATENT DOCUMENTS

| 8,061,595 B2 | 11/2011 | Yamada et al. |
| 2003/0066883 A1* | 4/2003 | Yu .................. G06Q 20/327 235/382 |

(Continued)

FOREIGN PATENT DOCUMENTS

| JP | 2003242116 A | 8/2003 |
| JP | 2006350429 A | 12/2006 |

(Continued)

OTHER PUBLICATIONS

Japanese Office Action (and English language translation thereof) dated Jun. 4, 2019 issued in counterpart Japanese Application No. 2018-056703.

(Continued)

*Primary Examiner* — Allyson N Trail
(74) *Attorney, Agent, or Firm* — Holtz, Holtz & Volek PC

(57) ABSTRACT

An authentication method for authenticating an electronic ticket stored in a portable information device by an authentication apparatus, including a step of acquiring, by the portable information device, shared information that is sharable with the authentication apparatus when authentication of the electronic ticket is performed, a step of generating, by the portable information device, a bar code based on the acquired shared information and the electronic ticket, a step of displaying the bar code by the portable information device, a step of reading, by the authentication apparatus, the electronic ticket and the shared information from the bar code displayed on the portable information device, and a step of performing, by the authentication apparatus, the authentication of the electronic ticket by making a comparison between contents of the shared information read from the bar code together with the electronic ticket and shared information in the authentication apparatus.

12 Claims, 6 Drawing Sheets

(58) Field of Classification Search
USPC .......................................................... 726/19
See application file for complete search history.

(56) References Cited

U.S. PATENT DOCUMENTS

| | | | |
|---|---|---|---|
| 2009/0032584 A1 | 2/2009 | Yamada et al. | |
| 2012/0091202 A1* | 4/2012 | Cohen | G06Q 10/02 235/382 |
| 2012/0290336 A1* | 11/2012 | Rosenblatt | H04B 5/00 705/5 |
| 2012/0330695 A1* | 12/2012 | Gallo | G06Q 20/322 705/5 |
| 2015/0262195 A1* | 9/2015 | Bergdale | G07C 9/29 705/5 |
| 2017/0206474 A1* | 7/2017 | McDonald | G07B 15/00 |
| 2017/0316423 A1* | 11/2017 | Inderst | H04W 12/06 |
| 2018/0026980 A1* | 1/2018 | Lee | H04W 12/06 713/168 |
| 2019/0043281 A1* | 2/2019 | Aman | G07C 9/00896 |
| 2019/0156541 A1* | 5/2019 | Isgar | G06F 40/186 |

FOREIGN PATENT DOCUMENTS

| | | |
|---|---|---|
| JP | 2007299369 A | 11/2007 |
| JP | 2010244525 A | 10/2010 |
| JP | 2010287250 A | 12/2010 |
| JP | 2016136665 A | 7/2016 |
| KR | 20160082100 A | 7/2016 |

OTHER PUBLICATIONS

Japanese Office Action (and English language translation thereof) dated Jun. 23, 2020 issued in counterpart Japanese Application No. 2018-056703.

* cited by examiner

AUTHENTICATION METHOD, AUTHENTICATION SYSTEM AND AUTHENTICATION APPARATUS

CROSS-REFERENCE TO RELATED APPLICATION

This application is based upon and claims the benefit of priority from the prior Japanese Patent Application No. 2018-056703, filed Mar. 23, 2018, the entire contents of which are incorporated herein by reference.

BACKGROUND OF THE INVENTION

1. Field of the Invention

The present invention relates to an authentication method, an authentication system and an authentication apparatus.

2. Description of the Related Art

In recent years, more and more concert venues and event sites have adopted electronic tickets for admission. This electronic ticket is ticket data acquired by various types of identification information being computerized and is used in substitution for an admission ticket or the like. The ticket data is delivered to a user via, for example, the Internet, and stored in a portable information device such as a smartphone. Then, the ticket data stored in the portable information device is embedded into a two-dimensional code such as a QR (Quick Response) code (registered trademark) to be displayed on a screen, read out by a data authentication apparatus at an entrance of a concert venue or the like so as to be judged (checked) for its authenticity.

In Japanese Patent Application Laid-Open (Kokai) Publication No. 2010-287250, an authentication system is disclosed in which, in response to a settlement request from a mobile communication terminal, a server requests the mobile communication terminal to present user information given to the mobile communication terminal in advance at the time of preliminary user authentication and time information acquired at the time of the user authentication. This authentication system requests the mobile communication terminal to present the user information and the time information by displaying, on a screen, a QR (Quick Response) code (registered trademark) generated from the user information and the time information, and authenticates through such a QR code (registered trademark) whether the user of the mobile communication terminal is a legitimate user. As a result of this configuration, a high level of security can be secured.

This technology can also be applied to the authentication of ticket data. By electronic ticket authentication using this technology, a high level of security can be secured.

However, even if the above-described technology is applied in electronic ticket authentication, there is still the following problem. That is, since an electronic ticket for a concert or the like is sold earlier than the date of the concert, it is necessary for convenience that the electronic ticket be confirmable by its purchaser (user of a portable information device) in advance. That is, the electronic ticket needs to be displayable as a QR code (registered trademark) on the screen of the portable information device at any given point in time. Accordingly, there is a risk that the QR code (registered trademark) displayed on the screen may be photographed (e.g. unauthorized photographing) by a third person who is not the legitimate purchaser and the acquired image may be used for the authentication of the electronic ticket.

SUMMARY OF THE INVENTION

An object of the present invention is to secure high security performance against unauthorized use of electronic tickets while maintaining convenience for users.

In accordance with one aspect of the present invention, there is provided an authentication method for authenticating an electronic ticket stored in a portable information device by an authentication apparatus, comprising: a step of acquiring, by the portable information device, shared information that is sharable with the authentication apparatus when authentication of the electronic ticket is performed; a step of generating, by the portable Information device, a bar code based on the acquired shared information and the electronic ticket; a step of displaying the bar code by the portable information device; a step of reading, by the authentication apparatus, the electronic ticket and the shared information from the bar code displayed on the portable information device; and a step of performing, by the authentication apparatus, the authentication of the electronic ticket by making a comparison between contents of the shared information read from the bar code together with the electronic ticket and shared information in the authentication apparatus.

In accordance with another aspect of the present invention, there is provided an authentication system comprising: a portable information device; and an authentication apparatus, wherein the portable information device includes a display and a processor which executes processing comprising: acquisition processing for acquiring shared information that is sharable with the authentication apparatus when authentication of an electronic ticket stored in the portable information device is performed; generation processing for generating a bar code based on the shared information acquired in the acquisition processing and the electronic ticket; and display processing for displaying, on the display, the bar code generated in the generation processing, and wherein the authentication apparatus includes a bar code scanner and a processor which executes processing comprising: read processing for reading the electronic ticket and the shared information from the bar code displayed on the portable information device; and authentication processing for performing the authentication of the electronic ticket by making a comparison between contents of the shared information read together with the electronic ticket in the read processing and shared information in the authentication apparatus.

In accordance with another aspect of the present invention, there is provided an authentication apparatus for authenticating an electronic ticket stored in a portable information device, comprising: a bar code scanner; and a processor which executes processing comprising: read processing for reading the electronic ticket and shared information from a bar code displayed on the portable information device; and authentication processing for performing authentication of the electronic ticket by making a comparison between contents of the shared information read together with the electronic ticket in the read processing and shared information in the authentication apparatus.

According to the present invention, high security performance can be secured against unauthorized use of electronic tickets while maintaining convenience for users.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

An embodiment of the present invention will hereinafter be described.

Figure 1:
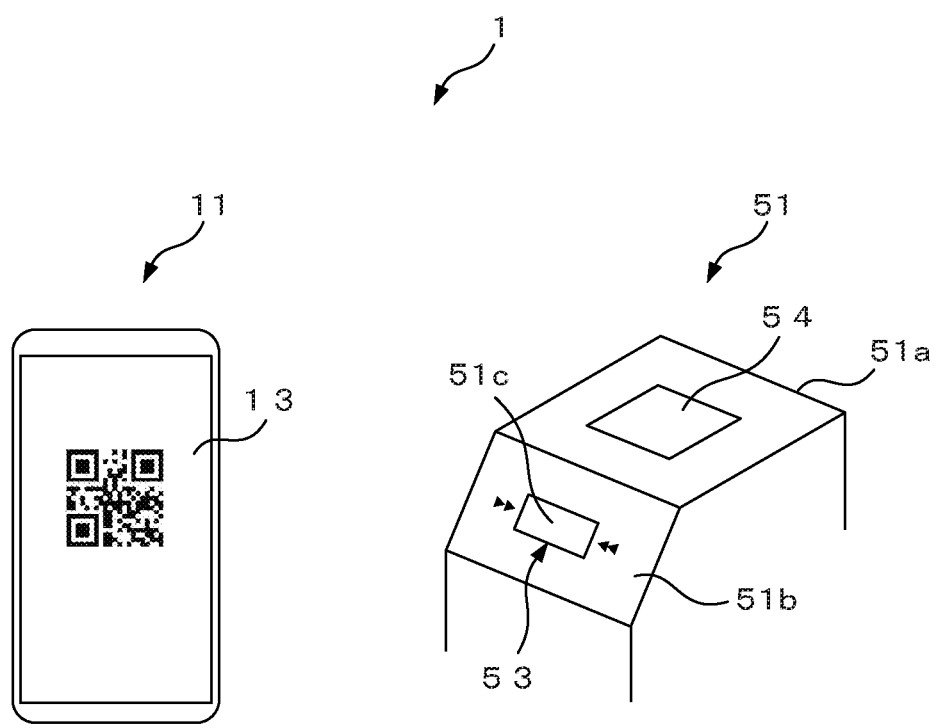
FIG. 1 is a schematic diagram showing an authentication system according to the present invention.

FIG. 1 is a schematic diagram showing an authentication system 1 according to an embodiment of the present invention. This authentication system 1 includes a portable information device 11 and an authentication apparatus 51, as shown in FIG. 1.

The portable information device 11 includes a display section 13 which displays a two-dimensional code based on an electronic ticket for a concert, an event or the like purchased in advance via the Internet. The portable information device 11 is constituted by a smartphone, a tablet or the like. The authentication apparatus 51 is to authenticate an electronic ticket, and includes a code reading section 53 which reads a two-dimensional code displayed on the display section 13 of the portable information device 11 and a display section 54 which displays a result of authentication of an electronic ticket or the like.

Figure 2:
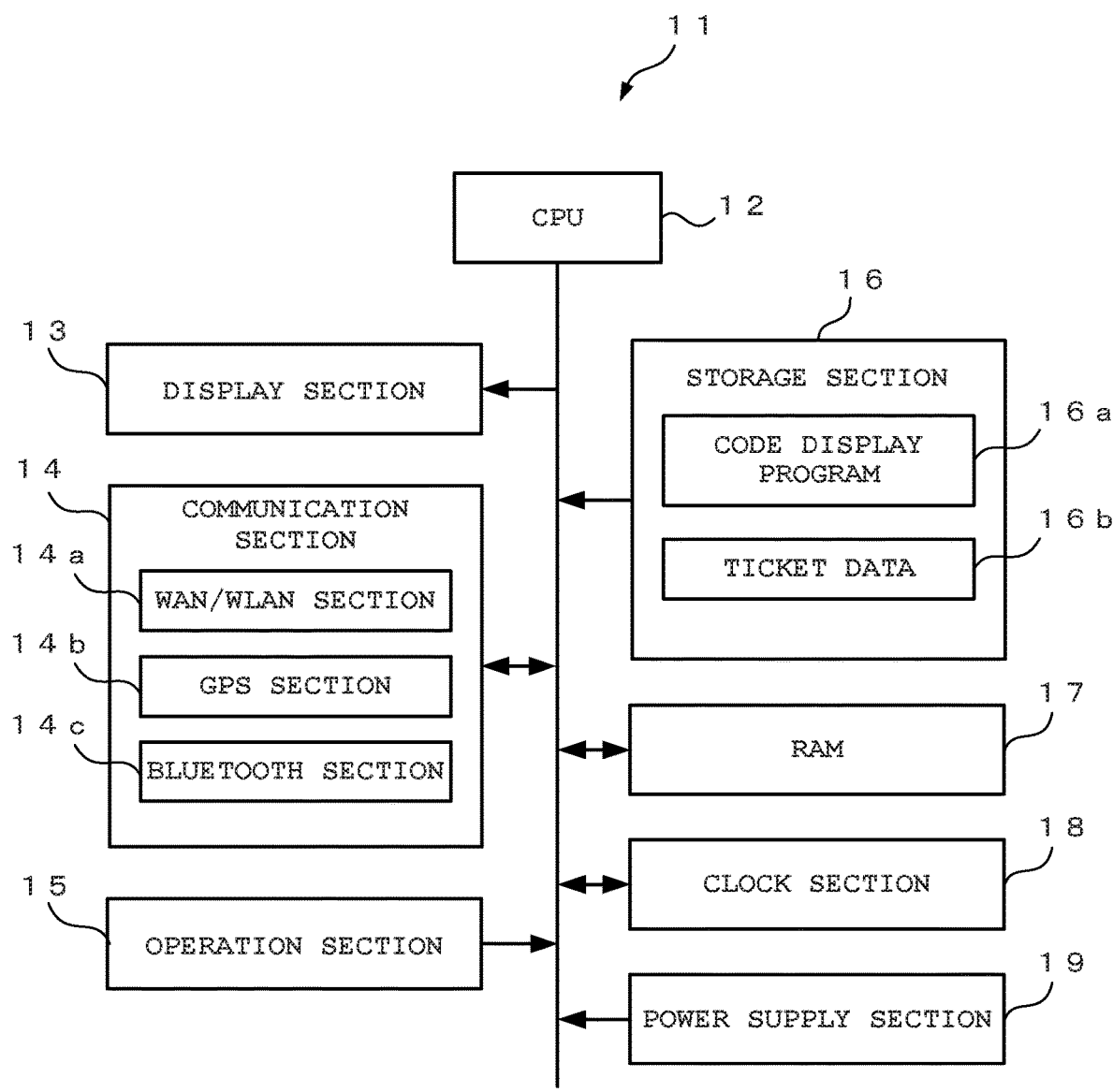
FIG. 2 is a block diagram showing a structural example of a portable information device.

FIG. 2 is a block diagram showing a structural example of the portable information device 11. This portable information device 11, which is constituted by a smartphone, a tablet or the like, includes a CPU (Central Processing Unit) 12, the display section 13, a communication section 14, an operation section 15, a storage section 16, a RAM (Random Access Memory) 17, a clock section 18, and a power supply section 19, as shown in FIG. 2.

The display section 13 is constituted by a liquid crystal monitor. The operation section 15 is constituted by a touch sensor of a capacitive type or the like, a circuit for driving the touch sensor, and a power key (none of which is shown) The touch sensor is integrally provided on a surface of the liquid crystal monitor to constitute a touch panel.

The communication section 14 is constituted by a WAN/WLAN section 14a, a GPS section 14b, and a Bluetooth (registered trademark) section 14c. The WAN/WLAN section 14a is a communication I/F which performs communication with another device via the Internet over a WAN (Wide Area Network) or performs communication with another device over a WLAN (Wireless LAN). The GPS section 14b receives a signal from a GPS (Global Positioning System) satellite and measures positional information such as the latitude and longitude of a present location. The Bluetooth (registered trademark) section 14c performs near field communication with a pre-registered device by means of Bluetooth (registered trademark).

The storage section 16 is constituted by a built-in flash memory whose memory contents are rewritable. The storage section 16 has stored therein various types of programs for causing the CPU 12 to control the operation of the portable information device 11 and various types of data. In particular, the storage section 16 has stored therein a code display program 16a for causing the CPU 12 to perform the later-described processing of generating a two-dimensional code and displaying it on the display section 13, as shown in FIG. 2. Also, the storage section 16 has stored therein ticket data 16b that is the data of an electronic ticket purchased by the user of the portable information device 11. Examples of the electronic ticket include an admission ticket to enter a concert venue, an event cite, an amusement park or the like and a passport ticket to enter an amusement park which can be used any number of times during a certain period of time.

The RAM 17 is a working memory for the CPU 12. The clock section 18 counts the current time and supplies the CPU 12 with time data which indicates the current time. The clock section 18 has a calendar function and also supplies the CPU 12 with date data. The power supply section 19 is constituted by a secondary battery, a DC/DC converter, and the like, and supplies each section of the portable information device 11 with electric power required for them to be operated.

Figure 3:
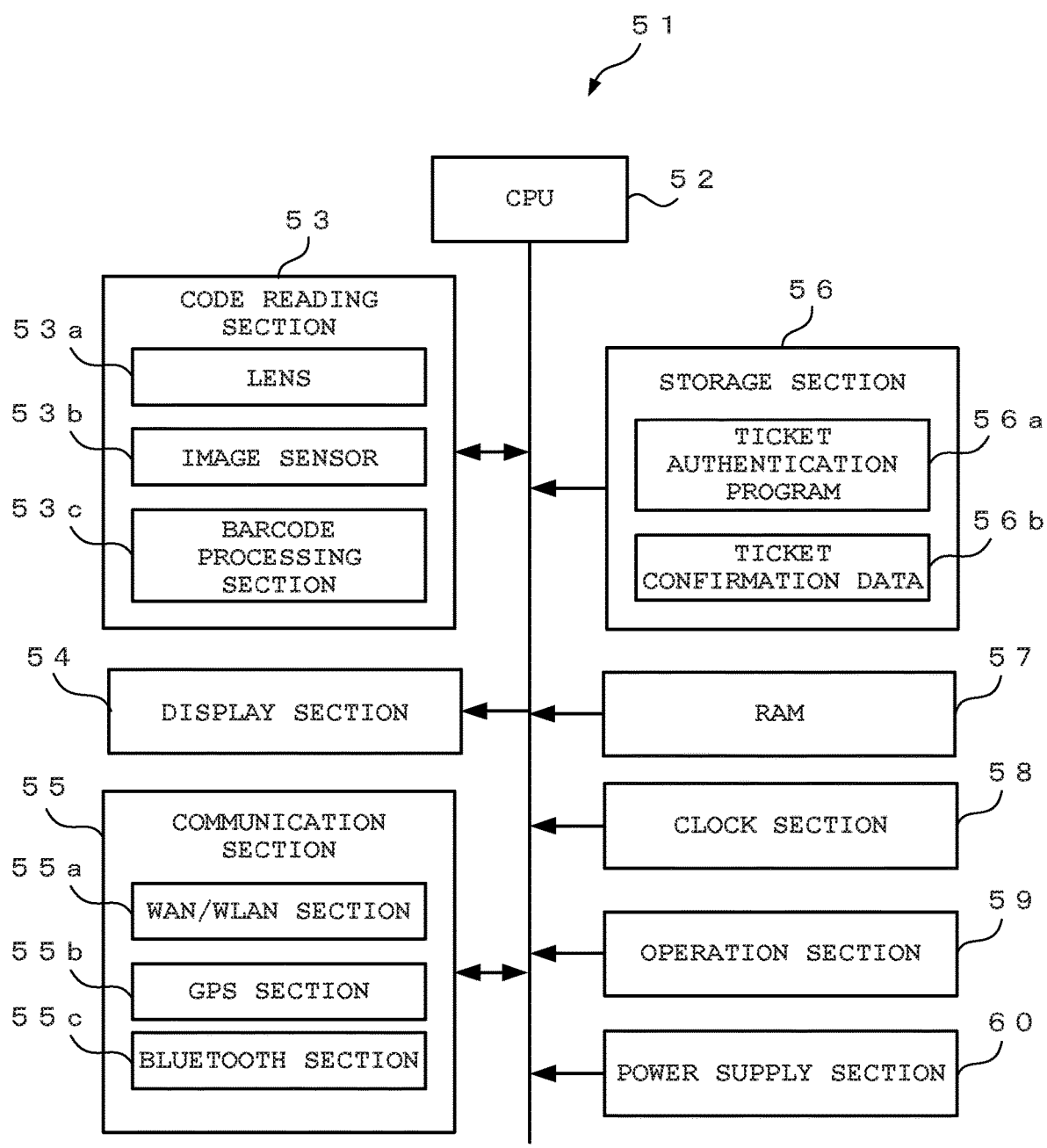
FIG. 3 is a block diagram showing a structure of an authentication apparatus.

FIG. 3 is a block diagram showing a structural example of the authentication apparatus 51. This authentication apparatus 51 includes a CPU 52, a code reading section 53, a display section 54, a communication section 55, a storage section 56, a RAM 57, a clock section 58, an operation section 59 and a power supply section 60, as shown in FIG. 3.

The code reading section 53 is constituted by a lens 53a, an image sensor 53b, and a bar code processing section 53c. The image sensor 53b is constituted by a CMOS (Complementary Metal-Oxide Semiconductor) or the like and captures, through the lens 53a, an image of the display screen of the portable information device 11 held over a code reading window 51c of the authentication apparatus 51. The bar code processing section 53c decodes, by predetermined image processing, a two-dimensional code in the image captured by the image sensor 53b, acquires code data given as the two-dimensional code and supplies the code data to the CPU 52.

The display section 54 is constituted by a liquid crystal monitor and displays a result of authentication of an electronic ticket and various types of information required to operate the authentication apparatus 51.

The communication section 55 is constituted by a WAN/WLAN section 55a, a GPS section 55b and a Bluetooth (registered trademark) section 55c. The WAN/WLAN section 55a is a communication I/F which performs communication with another device via the Internet over a WAN (Wide Area Network) or performs communication with another device over a WLAN (Wireless LAN). The GPS section 55b receives a signal from a GPS satellite and measures positional information such as the latitude and longitude of a present location. The Bluetooth (registered trademark) section 55c performs near field communication with another device by means of Bluetooth (registered trademark).

The storage section 56 is constituted by a built-in flash memory whose memory contents are rewritable. This storage section 56 has stored therein various types of programs for causing the CPU 52 to control the operation of the authentication apparatus 51 and various types of data. In particular, the storage section 56 has stored therein a ticket authentication program 56a for causing the CPU 52 to perform the later-described processing of authenticating an electronic ticket, as shown in FIG. 3. Also, this storage section 56 has stored therein ticket confirmation data 56b such as the class of an electronic ticket, which is used to confirm the contents of an electronic ticket to be authenticated.

The RAM 57 is a working memory for the CPU 52. The clock section 58 counts the current time and supplies the CPU 52 with time data which indicates the current time. The clock section 58 has a calendar function and also supplies the CPU 52 with date data. The operation section 59 is constituted by operation buttons (not shown) which are used to operate the authentication apparatus 51. The power supply section 60 is constituted by a power supply circuit which is connected to a commercial power source, and supplies each section of the authentication apparatus 51 with electric power required for them to be operated.

In the authentication system 1 according to the present embodiment, the user of the portable information device 11 performs a predetermined operation to give an instruction to display an electronic ticket (two-dimensional code), and then holds the display section 13 over the code reading section 53 of the authentication apparatus 51, whereby the authentication of the electronic ticket is performed. The operations of the portable information device 11 and the authentication apparatus 51 at the time of authentication of an electronic ticket are described below.

Figure 4:
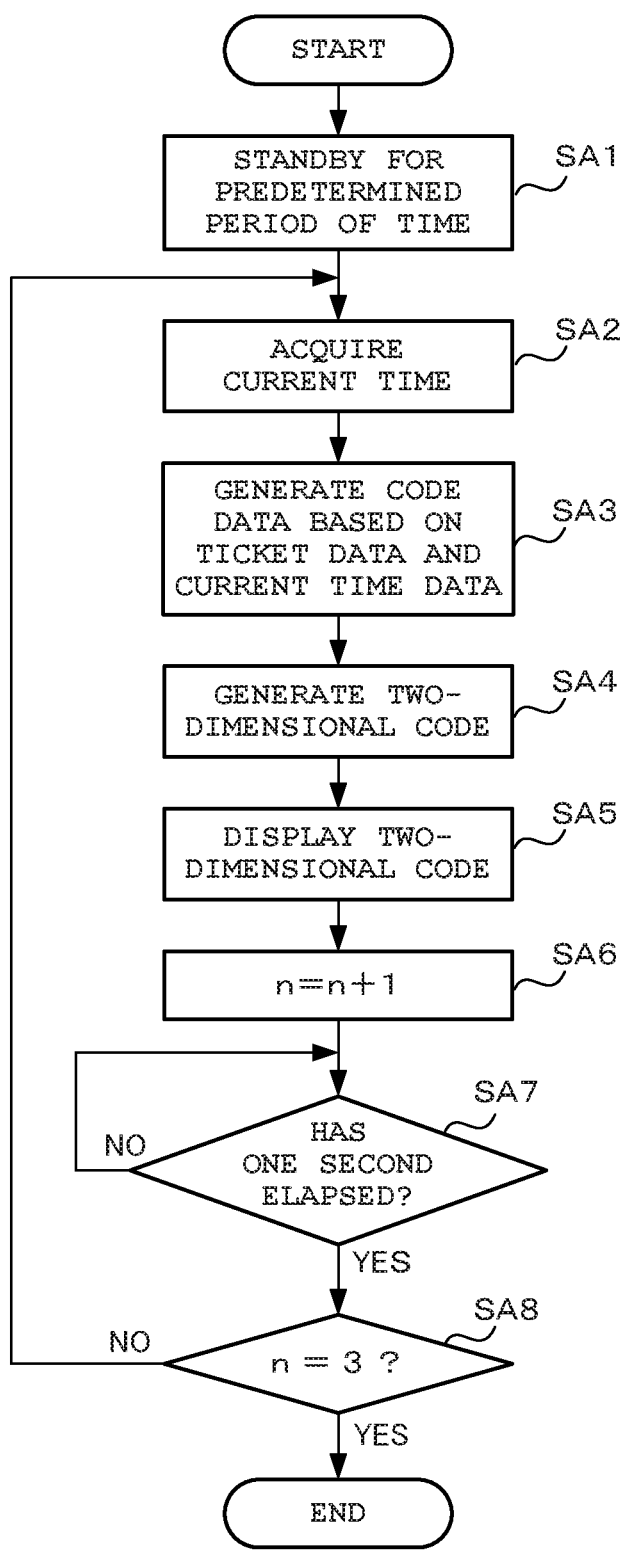
FIG. 4 is a flowchart showing code display processing in the portable information device.

FIG. 4 is a flowchart of processing which is executed by the CPU 12 of the portable information device 11 in accordance with the code display program 16a when the user gives an instruction to display an electronic ticket.

When the processing is started, the CPU 12 first performs standby processing for a predetermined period of time (Step SA1). This standby processing is to set aside a period of time from when the user gives an instruction to display an electronic ticket until when the user actually holds the display section 13 of the portable information device 11 over the code reading section 53 of the authentication apparatus 53. This predetermined period of time is for example, three seconds.

When the predetermined period of time elapses, the CPU 12 acquires the current time from the clock section 18 (Step SA2). Then, the CPU 12 reads out the ticket data 16b from the storage section 16 and generates code data based on the ticket data 16b and the acquired current time (Step SA3).

Next, the CPU 12 generates a two-dimensional code based on the generated code data (Step SA4) and causes the display section 13 to display the two-dimensional code (Step SA5). In addition, the CPU 12 increments the value (n) of a number-of-times counter which indicates the number of times a two-dimensional code has been displayed (Step SA6).

Subsequently, the CPU 12 waits until one second elapses from the time of the processing of Step SA2 (NO at Step SA7) Then, when one second has elapsed (YES at Step SA7), if the value (n) of the number-of-times counter has not reached "3" (the number of times the two-dimensional code has been displayed is not 3) at that point (NO at Step SA8), the CPU 12 returns to Step SA2. Hereafter, the CPU 12 repeats the processing from Step SA2 to Step SA7 until the value (n) of the number-of-times counter reaches "3".

Then, when the value (n) of the number-of-times counter reaches "3", the CPU 12 ends the processing at this point (YES at Step SA8).

Figure 6:
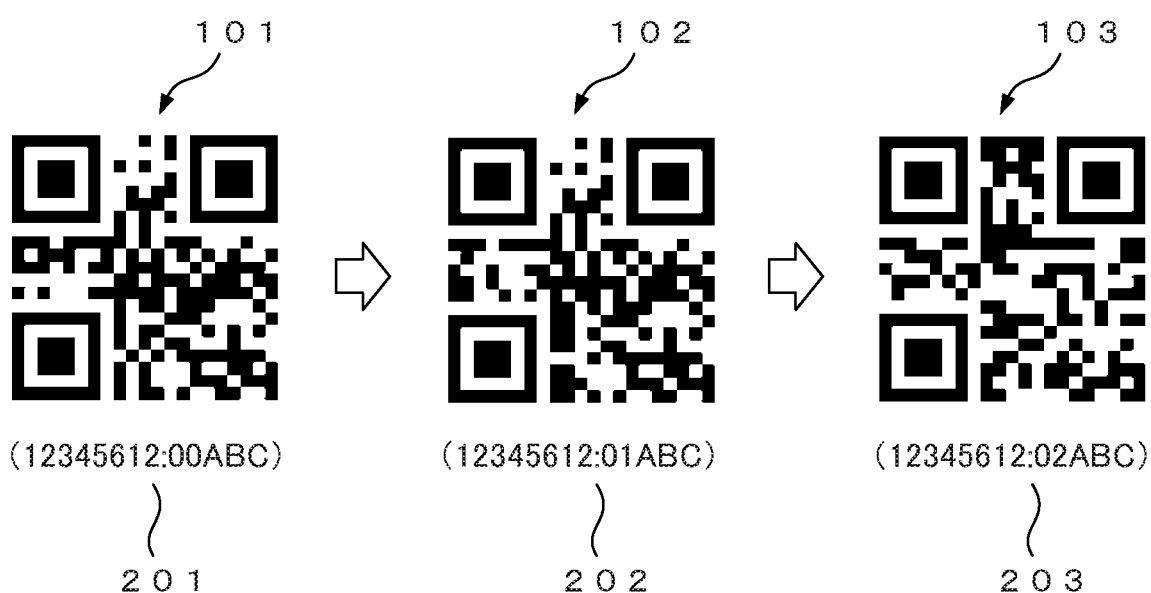
FIG. 6 is a transition diagram showing changes of two-dimensional codes which are displayed on the portable information device.

By the above-described processing, in electronic ticket authentication, a series of two-dimensional codes such as first, second and third two-dimensional codes 101, 102 and 103 shown in FIG. 6 are displayed one by one on the display section 13 of the portable information device 11 every one second. FIG. 6 shows a case where each of these two-dimensional codes 101, 102 and 103 is a OR code (registered trademark).

Character strings 201, 202, and 203 in parentheses under the two-dimensional codes 101, 102 and 103 shown in FIG. 6 denote, for descriptive purposes, the code data generated at Step SA3. Here, "12:00", "12:01" and "12:02" at predetermined character positions in the character strings 201, 202 and 203 are time data and, in the present embodiment, only the minute and second of the current time are used as time data that indicates the current time.

Figure 5:
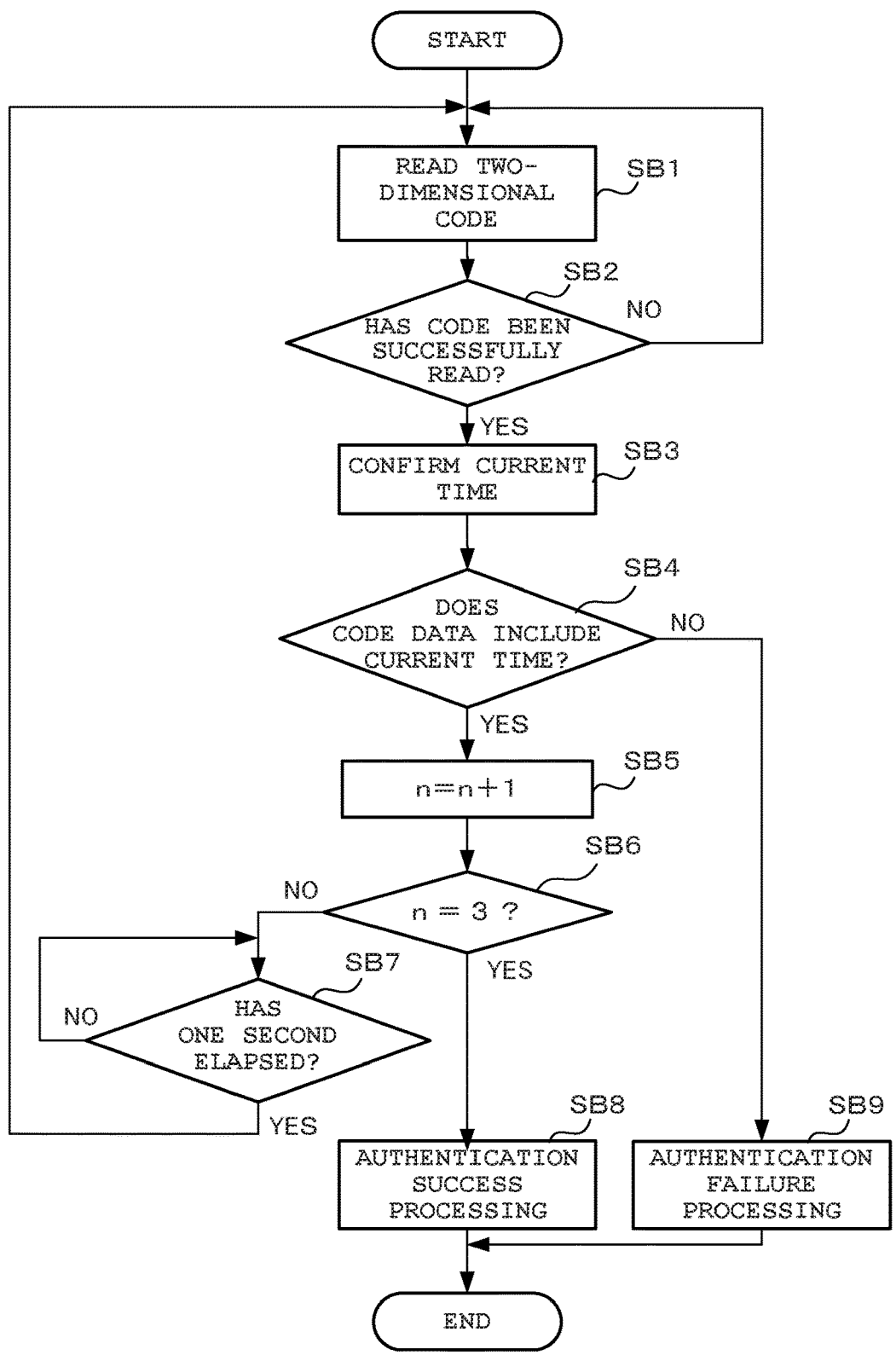
FIG. 5 is a flowchart showing code authentication processing in the authentication apparatus.

FIG. 5 is a flowchart of processing which is executed by the CPU 52 of the authentication apparatus 51 in accordance with the ticket authentication program 56a.

When the processing is started, the CPU 52 immediately causes the code reading section 53 to read a two-dimensional code (Step SB1). That is, the CPU 52 performs processing of causing the image sensor 53b to capture an image of the two-dimensional code, causing the bar code processing section 53c to decode the two-dimensional code in the captured image, and acquiring the code data thereof.

When the two-dimensional code is not successfully read and no code data is acquired (NO at Step SB2), the CPU 52 causes the code reading section 53 to repeatedly read the two-dimensional code until the code reading section 53 successfully reads the two-dimensional code.

Conversely, when the two-dimensional code is successfully read and the code data thereof is acquired (YES at Step SB2), the current time is acquired from the clock section 53 for confirmation (Step SB3).

Next, the CPU 52 confirms whether the acquired code data includes the current time (Step SB4). More specifically, the CPU 52 compares the time indicated by the acquired code data (display time of the two-dimensional code) with the reading time of the two-dimensional code, and confirms whether the display time and the reading time coincide with each other.

When the code data does not include the current time (NO at Step SB4), the CPU 52 performs authentication failure processing of causing the display section 54 to perform display indicating that the authentication of the electronic ticket has failed (Step SB9), and ends one authentication processing at that point.

Conversely, when the acquired code data includes the current time (YES at Step SB4), the CPU 52 increments the value (n) of a number-of-times counter which indicates the number of times a two-dimensional code has been successfully read (Step SB5).

Subsequently, the CPU 52 confirms whether the value (n) of the number-of-times counter has reached "3" (the number of times the two-dimensional code has been successfully read is 3). When the value (n) of the number-of-times counter has not reached (NO at Step SB6), the CPU 52 temporarily performs standby processing until one second elapses from the time of the processing of Step SB1 (NO at Step SB7).

Then, when one second has elapsed. (YES at Step SB7), the CPU 52 returns to Step SB1. Hereafter, the CPU 52 repeats the processing from Step SB1 to Step SB7 until the value (n) of the number-of-times counter reaches "3" (YES at Step SB6).

Then, when the value (n) of the number-of-times counter reaches "3" (YES at Step SB6), the CPU 52 performs authentication success processings of, for example, causing the display section 54 to perform display indicating that the authentication of the electronic ticket has succeeded (Step SB8), and ends one authentication processing at this point.

That is, when the display times respectively indicated by the code data read from the series of two-dimensional codes 101, 102 and 103 displayed one by one on the portable information device 11 every one second exactly coincide with the reading times of the series of two-dimensional codes 101, 102 and 103, the CPU 52 judges that the electronic ticket stored in the portable information device 11 is a legitimate electronic ticket. In other words, the CPU 52 judges that the owner of the portable information device 11 is a legitimate purchaser of the electronic ticket.

As described above, in the authentication system 1 according to the present embodiment, when the portable information device 11 is to display an electronic ticket (ticket data) as a two-dimensional code, time information indicating a display time at that point is embedded in the two-dimensional code. Then, when the display time coincides with a reading time of the two-dimensional code by the authentication apparatus 51, the electronic ticket is judged to be a legitimate electronic ticket.

This allows the user of the portable information device 11 (i.e. the purchaser of the electronic ticket) to confirm the electronic ticket by displaying it on the portable information device 11 as needed. Also, even if an electronic ticket displayed in advance is photographed so that the captured image can be used as the electronic ticket, it is not authenticated. This configuration makes it possible to secure high security performance against unauthorized use of electronic tickets while maintaining convenience for users.

Moreover, at the time of authentication, the portable information device 11 displays a series of two-dimensional codes including display times at intervals of 1 second, and the authentication apparatus 51 reads them individually. Then, when the display times respectively indicated by them exactly coincide with the reading times, the authentication apparatus 51 judges that the electronic ticket stored in the portable information device 11 is a legitimate ticket. This configuration makes it possible to, in authentication of an electronic ticket, secure higher security performance for the electronic ticket while maintaining convenience for the user as compared to a configuration where the electronic ticket is simply displayed once (as a two-dimensional code).

This advantageous effect can be acquired when the number of times a two-dimensional code has been displayed, that is, the number of times a two-dimensional code has been read is multiple times, which may be two times or may be four or more times.

Also, in the present embodiment, a current time to be acquired by the portable information device 11 and the authentication apparatus 51 is per-second time information, and two-dimensional codes are displayed and read at intervals of one second. However, a configuration may be adopted in which this current time to be acquired by the portable information device 11 and the authentication apparatus 51 is, for example, per-$\frac{1}{10}$-second time information so that two-dimensional codes are displayed and read at intervals of less than one second.

In that configuration, for example, by a synchronization signal being transmitted from the portable information device 11 to the authentication apparatus 51, the display timing of a two-dimensional code on the portable information device 11 side and the reading timing of the two-dimensional code on the authentication apparatus 51 side can be accurately synchronized.

Also, in the case where two-dimensional codes are displayed and read at intervals of less than one second, the system may be configured such that the authentication apparatus 51 makes a comparison between the display time of a two-dimensional code indicated by code data acquired from the two-dimensional code and the reading time of the two-dimensional code and, if the difference between the display time and the reading time does not exceed a predetermined threshold, judges that the display time and the reading time coincide with each other.

Moreover, in another configuration which is different from the present embodiment and in which the portable information device 11 displays an electronic ticket as a two-dimensional code only once in the authentication of the electronic ticket, information to be embedded in the two-dimensional code may be information other than time information indicating the display time of the two-dimensional code as long as it is shared information which can be shared with the authentication apparatus 51. Even with this configuration where shared information other than time information is used, it is possible to secure high security performance against unauthorized use of electronic tickets while maintaining convenience for users.

An example of the shared information is positional information such as a latitude and a longitude which can be acquired from the GPS section 14b of the portable information device 11 or the GPS section 55b of the authentication apparatus 51 and which indicates a present location. However, since such positional information includes an inevitable error in the system, the system is required to be configured such that the authentication apparatus 51 (i.e. the CPU 52) makes a comparison between a present location indicated by positional information acquired from a two-dimensional code and the present location of the authentication apparatus 51 and, if the difference between the present locations (i.e. the distance between the present locations on a map) does not exceed a predetermined threshold, judges that the present locations coincide with each other.

Another example of the shared information that is shared with the authentication apparatus 51 is information indicating an inclination angle of the portable information device 11 at the time of display of an electronic ticket by the portable information device 11. The inclination angle of the portable information device 11 herein is an inclination angle with respect to a horizontal planes) in a vertical and/or horizontal direction(s) of a screen display on the display section 13 (such as the liquid crystal monitor).

For example, in the authentication apparatus 51 shown in FIG. 1, the code reading section 53 is provided on an inclined front surface section 51b of an apparatus body 51a, and the inclination angle of the front surface section 51b is known. Accordingly, by each user being prompted to press the display section 13 of the portable information device 11 against the front surface section 51b of the apparatus body 51a in the authentication of an electronic ticket, the inclination angle of the portable information device 11 is always substantially equal to the inclination angle of the front surface section 51b. As a result, the inclination angle of the portable information device 11 can be used as the above-described shared information. Note that, in that case as well, the system is required to be configured such that, in the authentication of an electronic ticket, the authentication apparatus 51 makes a comparison between an inclination angle indicated by inclination information acquired from a two-dimensional code and the known inclination angle and, if the difference between the inclination angles does not exceed a predetermined threshold, judges that the inclination angles coincide with each other.

In the present embodiment the configuration has been described in which the portable information device 11 displays a two-dimensional code based on an electronic ticket. However, this two-dimensional code may be replaced by a one-dimensional bar code constituted by a combination of bars and spaces.

Moreover, in the present embodiment, the stationary dedicated apparatus has been described as an example of the authentication apparatus 51 of the present invention. However, the authentication apparatus 51 may be actualized by a hand-held bar code reader or a tablet computer which can be carried by a worker who performs an authentication operation.

While the present invention has been described with reference to the preferred embodiments, it is intended that the invention be not limited by any of the details of the description therein but includes all the embodiments which fall within the scope of the appended claims.

What is claimed is:

1. An authentication method for authenticating an electronic ticket stored in a portable information device by an authentication apparatus, the method comprising:
   acquiring, by the portable information device, shared information that is sharable with the authentication apparatus when authentication of the electronic ticket is performed;
   generating, by the portable information device, a bar code based on the acquired shared information and the electronic ticket;
   displaying the bar code by the portable information device;
   reading, by the authentication apparatus, the electronic ticket and the shared information from the bar code displayed on the portable information device; and
   performing, by the authentication apparatus, the authentication of the electronic ticket,
   wherein:
   the shared information comprises time information indicating a display time of the bar code,
   the portable information device performs time information acquisition, bar code generation, and bar code display a plurality of times at different timings in the authentication of the electronic ticket, and
   the authentication apparatus performs the authentication of the electronic ticket by making a comparison between time information read together with the electronic ticket from each of a plurality of bar codes displayed on the portable information device at the different timings and time information in the authentication apparatus.

2. The authentication method according to claim 1, wherein the shared information comprises position data indicating a present location.

3. The authentication method according to claim 1, wherein the bar code comprises a two-dimensional code.

4. The authentication method according to claim 1, wherein the time information in the authentication apparatus indicates a reading time of a bar code.

5. An authentication system comprising:
a portable information device; and
an authentication apparatus,
wherein:
the portable information device includes a display and a processor which executes processing comprising:
   acquisition processing for acquiring shared information that is sharable with the authentication apparatus when authentication of an electronic ticket stored in the portable information device is performed;
   generation processing for generating a bar code based on the shared information acquired in the acquisition processing and the electronic ticket; and
   display processing for displaying, on the display, the bar code generated in the generation processing,
the authentication apparatus includes a bar code scanner and a processor which executes processing comprising:
   read processing for reading the electronic ticket and the shared information from the bar code displayed on the portable information device; and
   authentication processing for performing the authentication of the electronic ticket,
the shared information comprises time information indicating a display time of the bar code,
the portable information device performs time information acquisition, bar code generation, and bar code display a plurality of times at different timings in the authentication of the electronic ticket, and
the authentication apparatus performs the authentication of the electronic ticket by making a comparison between time information read together with the electronic ticket from each of a plurality of bar codes displayed on the portable information device at the different timings and time information in the authentication apparatus.

6. The authentication system according to claim 5, wherein the shared information comprises position data indicating a present location.

7. The authentication system according to claim 5, wherein the bar code comprises a two-dimensional code.

8. The authentication system according to claim 5, wherein the time information in the authentication apparatus indicates a reading time of a bar code.

9. An authentication apparatus for authenticating an electronic ticket stored in a portable information device, the authentication apparatus comprising:
   a bar code scanner; and
   a processor which executes processing comprising:
      read processing for reading the electronic ticket and time information from a bar code displayed on the portable information device, the time information indicating a display time of the bar code; and
      authentication processing for performing authentication of the electronic ticket,
   wherein the portable information device performs time information acquisition, bar code generation, and bar code display a plurality of times at different timings in the authentication of the electronic ticket, and
   wherein the processor executes the authentication processing for performing the authentication of the electronic ticket by making a comparison between time information read together with the electronic ticket from each of a plurality of bar codes displayed on the portable information device at the different timings and time information in the authentication apparatus.

10. The authentication apparatus according to claim 9, wherein the shared information comprises position data indicating a present location.

11. The authentication apparatus according to claim 9, wherein the bar code comprises a two-dimensional code.

12. The authentication apparatus according to claim 9, wherein the time information in the authentication apparatus indicates a reading time of a bar code.

* * * * *